(12) United States Patent
Choi et al.

(10) Patent No.: US 12,261,920 B2
(45) Date of Patent: Mar. 25, 2025

(54) DEVICE AND METHOD FOR PERFORMING DYNAMIC-SERVICE-ORIENTED COMMUNICATION BETWEEN VEHICLE APPLICATIONS ON AUTOSAR ADAPTIVE PLATFORM

(71) Applicant: POPCORNSAR CO., LTD., Seoul (KR)

(72) Inventors: Yun Ki Choi, Seoul (KR); Yong Ho Lee, Seoul (KR); Won Seok Choi, Namyangju-si (KR); Kap Hyun Kim, Ansan-si (KR)

(73) Assignee: POPCORNSAR CO., LTD., Seoul (KR)

( * ) Notice: Subject to any disclaimer, the term of this patent is extended or adjusted under 35 U.S.C. 154(b) by 0 days.

(21) Appl. No.: 18/012,590

(22) PCT Filed: Sep. 29, 2021

(86) PCT No.: PCT/KR2021/013396
§ 371 (c)(1),
(2) Date: Dec. 22, 2022

(87) PCT Pub. No.: WO2023/013814
PCT Pub. Date: Feb. 9, 2023

(65) Prior Publication Data
US 2024/0106916 A1    Mar. 28, 2024

(30) Foreign Application Priority Data
Aug. 6, 2021 (KR) .................. 10-2021-0103816

(51) Int. Cl.
*H04L 67/562*    (2022.01)
*H04L 12/40*    (2006.01)
(Continued)

(52) U.S. Cl.
CPC ...... *H04L 67/562* (2022.05); *H04L 12/40091* (2013.01); *H04L 67/12* (2013.01); *H04L 67/62* (2022.05)

(58) Field of Classification Search
CPC . H04L 67/562; H04L 67/62; H04L 12/40091; H04L 67/12
See application file for complete search history.

(56) References Cited

U.S. PATENT DOCUMENTS 9,755,968 B2 * 9/2017 Kim ................ H04L 69/326
10,776,169 B2 * 9/2020 Teshler ............ H04L 9/0822
(Continued)

FOREIGN PATENT DOCUMENTS

KR    10-2239251    4/2021

OTHER PUBLICATIONS

International Search Report for International Application No. PCT/KR2021/013396, dated Oct. 19, 2022.
(Continued)

*Primary Examiner* — Nazia Naoreen
(74) *Attorney, Agent, or Firm* — KILE PARK REED & HOUTTEMAN PLLC

(57) ABSTRACT

The present invention relates to a device and method for implementing dynamic-service-oriented communication between vehicle applications on an AUTomotive Open System ARchitecture (AUTOSAR) adaptive platform (AP). A machine including an electronic control unit (ECU) to which the portable operating system interface (POSIX) operating system (OS) is ported and implementing dynamic-service-oriented communication between vehicle applications on an AUTOSAR AP includes a skeleton which is an application for providing a service on the platform, a proxy which is an application using the service on the platform, and a service communication management (CM) which is an application
(Continued)

for brokering service-oriented communication between vehicle applications on the platform.

7 Claims, 15 Drawing Sheets

(51) Int. Cl.
*H04L 67/12* (2022.01)
*H04L 67/62* (2022.01)

(56) References Cited

U.S. PATENT DOCUMENTS 11,538,287 B2 * 12/2022 Fang ................ G07C 5/0808
11,765,016 B2 * 9/2023 Park ................ H04L 43/065
370/216

OTHER PUBLICATIONS

Written Opinion for International Application No. PCT/KR2021/013396, dated Oct. 19, 2022.
AUTOSAR. Specification of communication management. AUTOSAR AP R19-11. Nov. 28, 2019.
Arestova, Anna et al. A service-oriented real-time communication scheme for AUTOSAR adaptive using OPC UA and time-sensitive networking. Sensors. 2021, vol. 21, 2337, Mar. 27, 2021.
AUTOSAR. Explanation of ara::com API. AUTOSAR AP R19-11. Nov. 28, 2019.
AUTOSAR. SOME/IP service discovery protocol specification. AUTOSAR FO R19-11. Nov. 28, 2019.

* cited by examiner

DEVICE AND METHOD FOR PERFORMING DYNAMIC-SERVICE-ORIENTED COMMUNICATION BETWEEN VEHICLE APPLICATIONS ON AUTOSAR ADAPTIVE PLATFORM

TECHNICAL FIELD

The present invention relates to a device and method for performing dynamic-service-oriented communication between vehicle applications on an AUTomotive Open System ARchitecture (AUTOSAR) adaptive platform (AP). More particularly, the present invention relates to a device configured with an application at the level of a platform which comprehensively manages registration and detection of a service provided or used by a vehicle application and communication for providing and using the service, to perform dynamic-service-oriented communication between vehicle applications on an AUTOSAR AP, and a dynamic-service-oriented communication method between vehicle applications employing the device.

BACKGROUND ART

In 2005, the AUTomotive Open System ARchitecture (AUTOSAR) was established by major automobile manufacturers and developers for software reuse in the automotive field.

After that, the need for a new electric and electronic architecture, such as electronic control unit (ECU) integration, was raised for network connection, autonomous driving, and electrification, which are three major topics in the automobile industry, and an AUTOSAR adaptive platform (AP) standard which is an ECU software platform standard based on a high-performance central processing unit (CPU) was newly established in 2017 and has been applied to mass production since 2019.

The movement to operate a vehicle on the basis of an AUTOSAR AP using a single platform, such as a smartphone, is rapidly progressing, and not only major global original equipment manufacturers (OEMs) but also local OEMs are preparing to develop a new ECU to which an AUTOSAR AP is applied.

Unlike AUTOSAR classic platforms based on signal-oriented communication, AUTOSAR APs are based on service-oriented communication, in which a skeleton that is a service provider and a proxy that is a service user are dynamically connected through service discovery and Scalable service-Oriented MiddlewarE over Internet protocol (SOME/IP). A functional cluster in charge of such service-oriented communication between AUTOSAR AP applications is a communication management (CM).

There are specifications of a CM in AUTOSAR standards, but the specifications are not defined in detail. Accordingly, the implementation form of a CM may considerably vary depending on the developer. CM specifications propose a structure in which two applications are connected to each other through a port. One SOME/IP endpoint is disposed per port, but there is no limit on the number of ports. Therefore, according to a design method of the developer, the number of ports may notably increase when an application is large in scale, which results in the waste of resources. Also, when a skeleton and a proxy directly communicate, each of the skeleton and proxy needs a buffer and registry structure. Accordingly, an application increases in scale, and the problem of load worsens.

DISCLOSURE

Technical Problem

The present invention is directed to providing a device that includes a machine (an electronic control unit (ECU) to which the portable operating system interface (POSIX) operating system (OS) is ported) of which internal and external communication functions are integrated into a communication management (CM), to implement dynamic-service-oriented communication between vehicle applications without directly connecting a skeleton and a proxy and a service-oriented communication method employing the device.

Objects of the present invention are not limited to that described above, and other objects which have not been described will be clearly understood by those of ordinary skill in the art from the following descriptions.

Technical Solution

One aspect of the present invention provides a machine including an ECU to which a POSIX OS is ported and implementing dynamic-service-oriented communication between vehicle applications on an AUTomotive Open System ARchitecture (AUTOSAR) adaptive platform (AP), the machine including a skeleton which is an application for providing a service on the platform, a proxy which is an application using the service on the platform, and a service communication management (CM) which is an application for brokering service-oriented communication between vehicle applications on the platform.

The service CM may include a service registry configured to store information on the service provided by the skeleton and information on the service used by the proxy, a service discovery configured to transmit a notification of starting to provide the service or a search request message (a service discovery message) for using the service through Ethernet multicast when a service registered in the service registry is to be provided to a vehicle application of another ECU or use the vehicle application of the other ECU, and a Scalable service-Oriented MiddlewarE over Internet protocol (SOME/IP) bridge in charge of data communication in accordance with a service provided or used by the other ECU.

The service CM may further include an inter-process communication (IPC) port used in communication between the skeleton and the proxy, a service discovery (SD) multicast port configured to transmit the service discovery message generated by the service discovery to the other ECU through Ethernet multicast, receive a service discovery message transmitted by the other ECU through Ethernet multicast, and transfer the service discovery message to the service discovery, and a service endpoint port used in data communication between the SOME/IP bridge and the other ECU.

The service endpoint port may follow a transmission control protocol (TCP) or a user datagram protocol (UDP).

The service CM may be only one in the machine.

The skeleton and the proxy may not be directly connected to each other, and the skeleton or the proxy may communicate with the service CM through IPC.

Another aspect of the present invention provides a system for implementing dynamic-service-oriented communication between vehicle applications, the system including the machine.

Another aspect of the present invention provides an input message processing method of a service CM when a start-of-service-provision notification message is input to an IPC port of the service CM which brokers service-oriented communication between vehicle applications, the input message processing method including transferring the message to a service registry in which information on a service provided or used in the corresponding machine is stored, registering service information related to the message in the service registry when the service information related to the message has not been registered in the service registry, generating a message notifying of a start of service provision according to a SOME/IP and transmitting the message to another ECU when the service information is of a SOME/IP type, and generating a message notifying of a stop of service provision according to the SOME/IP and transmitting the message to the other ECU when a certain time-to-live (TTL) expires.

Another aspect of the present invention provides an input message processing method of a service CM when a stop-of-service-provision notification message is input to an IPC port of the service CM which brokers service-oriented communication between vehicle applications, the input message processing method including transferring the message to a service registry in which information on a service provided or used in the corresponding machine is stored, removing service information related to the message from the service registry when the service information related to the message has been registered in the service registry, and generating a message notifying of a stop of service provision according to a SOME/IP and transmitting the message to another ECU when the service information is of a SOME/IP type.

Another aspect of the present invention provides an input message processing method of a service CM when a search request message for service use is input to an IPC port of the service CM which brokers service-oriented communication between vehicle applications, the input message processing method including transferring the message to a service registry in which information on a service provided or used in the corresponding machine is stored, registering service information related to the message in the service registry when the service information related to the message has not been registered in the service registry, and generating a search request message for service use according to a SOME/IP and transmitting the search request message to another ECU when the service information is of a SOME/IP type.

Another aspect of the present invention provides an input message processing method of a service CM when any one of a message for actual service use and a message for actual service provision is input to an IPC port of the service CM which brokers service-oriented communication between vehicle applications, the input message processing method including transferring the message to a service registry in which information on a service provided or used in the corresponding machine is stored, adding a SOME/IP header in front of data included in the message when an identifier (ID) of the service exists in the service registry, and transmitting the message to which the SOME/IP header is added to another ECU.

Another aspect of the present invention provides an input message processing method of a service CM when a start-of-service-provision notification message following a SOME/IP protocol is input to an SD multicast port of the service CM which brokers service-oriented communication between vehicle applications, the input message processing method including transferring the message to a service registry in which information on a service provided or used in the corresponding machine is stored, and registering service information related to the message in the service registry when the service information related to the message has not been registered in the service registry.

Another aspect of the present invention provides an input message processing method of a service CM when a search request message for service use following a SOME/IP protocol is input to an SD multicast port of the service CM which brokers service-oriented communication between vehicle applications, the input message processing method including transferring the message to a service registry in which information on a service provided or used in the corresponding machine is stored, and registering service information related to the message in the service registry when the service information related to the message has not been registered in the service registry.

Another aspect of the present invention provides an input message processing method of a service CM when a stop-of-service-provision notification message following a SOME/IP protocol is input to an SD multicast port of the service CM which brokers service-oriented communication between vehicle applications, the input message processing method including transferring the message to a service registry in which information on a service provided or used in the corresponding machine is stored, and removing service information related to the message from the service registry when the service information related to the message has been registered in the service registry.

Another aspect of the present invention provides an input message processing method of a service CM when a SOME/IP message transmitted by a service instance of another ECU is input to a service endpoint of the service CM which brokers service-oriented communication between vehicle applications, the input message processing method including determining whether the message matches a service registered in a service registry in which information on a service provided or used in the corresponding machine is stored, receiving an endpoint address of an application corresponding to the matching service from the service registry when the message matches a service registered in the service registry, transferring the message and the endpoint address of the application to an IPC port of the service CM, and transmitting, by the IPC port, the message to a vehicle application connected to the IPC port.

Another aspect of the present invention provides a service-oriented communication method of a skeleton which is an application for providing a service on an AUTOSAR AP, the service-oriented communication method including transmitting a start-of-service-provision notification message to a service CM which is an application for brokering service-oriented communication between vehicle applications in a machine including the skeleton, receiving a service request message from the service CM, classifying the service request message as a method call message (a Request message) or an event message subscription request message (a SubscribeEventGroup message) in accordance with a parsing result of the service request message, calling a corresponding method and transmitting a Response message generated as a result of calling the method to the service CM when the service request message is classified as the Request message, registering content of the message in a subscriber registry when the service request message is classified as the SubscribeEventGroup message, generating and transmitting the event message to the service CM when a condition for transmitting the event message is satisfied, and generating and transmitting a stop-of-service-provision notification message to the service CM when a service instance termination condition is satisfied.

Another aspect of the present invention provides a service-oriented communication method of a proxy which is an application using a service on an AUTOSAR AP, the service-oriented communication method including transmitting a search request message for service use to a service CM which is an application for brokering service-oriented communication between vehicle applications in a machine including the proxy, receiving a response to the message from the service CM, selecting one service from a list of currently available services, determining a way of receiving the service, generating and transmitting a method call message (a Request message) to the service CM when the way of receiving the service is a way of specifying and calling a method, generating and transmitting an event message subscription request message (a SubscribeEventGroup message) to the service CM when the way of receiving the service is subscribing to event messages, receiving a message for providing the service from the service CM, parsing and classifying the message for providing the service, transferring a result to a user implementation part through a method caller when the message for providing the service is classified as a method execution result message (a Response message), storing the event message in an event buffer when the message for providing the service is classified as an event message (an Event message), and generating and transmitting a stop-of-service-use notification message to the service CM when a service instance termination condition is satisfied.

Advantageous Effects

According to an embodiment of the present invention, a service registry and a service discovery required for service brokerage are integrated into a communication management (CM). Accordingly, the load of an application, such as the load of memory, communication, etc., is reduced compared to a case in which each of a skeleton and a proxy manages a buffer and a registry, and appropriate service matching can be rapidly performed between a skeleton and a proxy.

Also, according to an embodiment of the present invention, functions of communication with another electronic control unit (ECU) are integrated into a CM so that the number of ports that an application has is reduced. Accordingly, resources, such as a buffer occupied by each port, threads, etc., occupied by a portable operating system interface (POSIX) operating system (OS) are reduced, and thus stability is increased.

In addition, according to an embodiment of the present invention, service registries and service discoveries which will be separately implemented in several applications are handled in one process so that the size of a program is reduced when the program is compiled.

MODES OF THE INVENTION

The advantages and features of the present invention and methods of achieving them will become more apparent through embodiments described in detail with reference to the accompanying drawings. However, the present invention is not limited to the embodiments set forth herein and can be implemented in various different forms. The embodiments are merely provided to make the disclosure of the present invention complete and fully convey the scope of the present invention to those skilled in the technical field to which the present invention pertains. The present invention is only defined by the claims. Meanwhile, terminology used in this specification is for the purpose of describing the embodiments and is not intended to limit the present invention. In this specification, the singular also includes the plural unless specifically described in the context. As used herein, the terms "comprises" and/or "comprising" do not exclude the presence or addition of one or more components, steps, operations, and/or devices other than stated components, steps, operations, and/or devices.

Hereinafter, a device and method for implementing dynamic-service-oriented communication between vehicle applications on an AUTomotive Open System ARchitecture (AUTOSAR) adaptive platform (AP) according to the present invention will be described.

Figure 1:
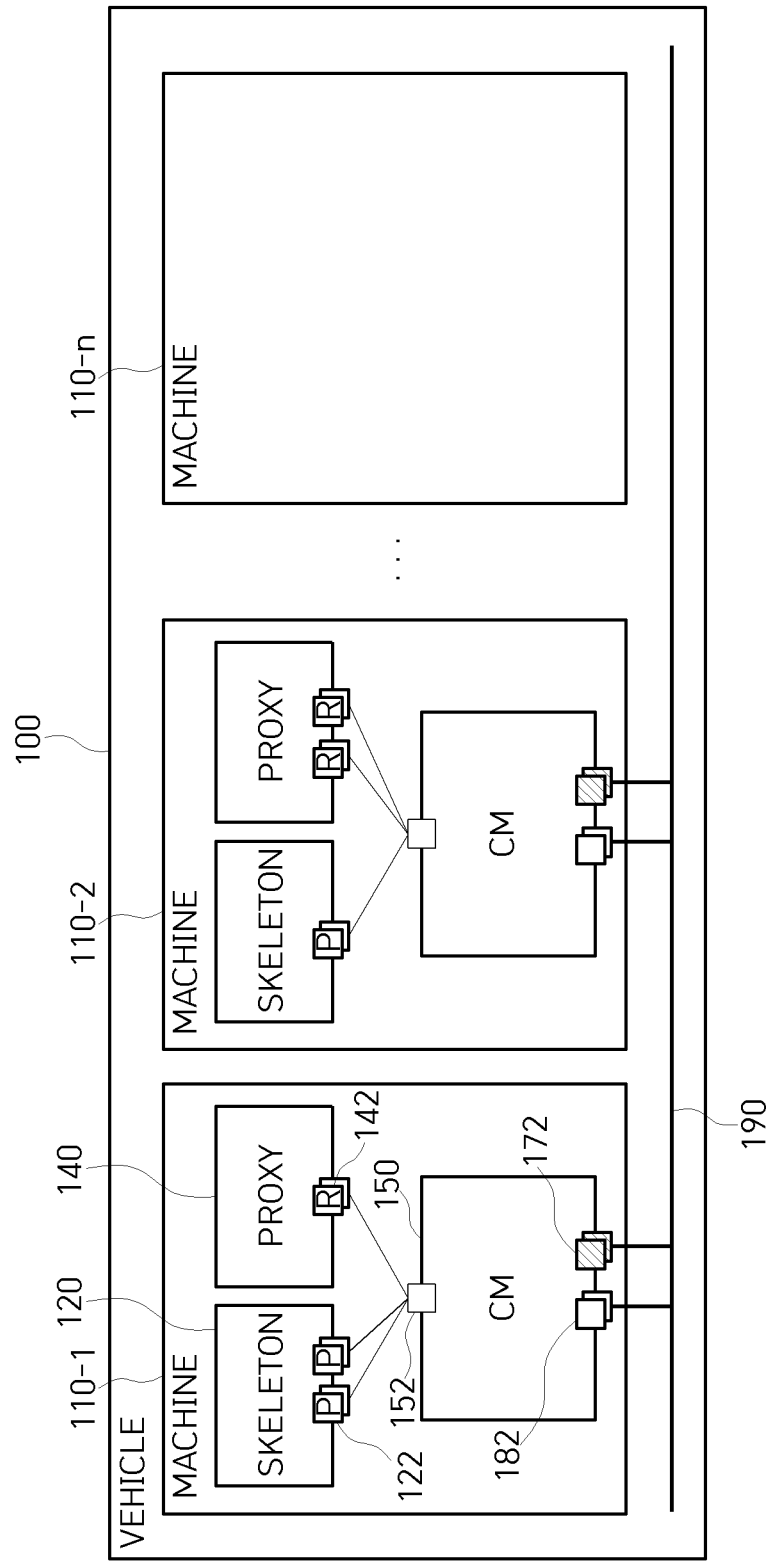
FIG. 1 is a diagram illustrating a configuration and a connection structure of a device for performing dynamic-service-oriented communication between vehicle applications on an AUTomotive Open System ARchitecture (AUTOSAR) adaptive platform (AP).

FIG. 1 is a diagram illustrating a configuration and a connection structure of a device for implementing dynamic-service-oriented communication between vehicle applications on an AUTOSAR AP.

A system for implementing dynamic-service-oriented communication between vehicle applications basically has a structure in which a plurality of machines 110-1 to 110-7 are connected to one vehicle 100 through ports 172 and 182 and an Ethernet 190 of the vehicle. "Machine" is a term related to APs, and each of the machines 110-1 to 110-n is one electronic control unit (ECU) to which one portable operating system interface (POSIX) operating system (OS) is ported. The system includes at least one machine, but an ECU that is not a machine may be included in the system. An application in the ECU that is not a machine may provide a service to an application in the machine of the system or use a service of the application in the machine of the system. Each of the machines 110-1 to 110-*n* (hereinafter "110") includes a skeleton 120, a proxy 140, and a service communication management (CM) (hereinafter "CM") 150. The skeleton 120 is a vehicle application that provides a service, and is a POSIX process having a service provider instance for playing the role of a service provider. The proxy 140 is a vehicle application that uses a service, and is a POSIX process having a service consumer instance for playing the role of a service user. A plurality of skeletons 120 or a plurality of proxies 140 may exist in each machine 110. Also, one application may be the skeleton 120 as well as the proxy 140 at the same time. The CM 150 is a platform application that brokers service-oriented communication of vehicle applications. The number of CMs 150 existing in one machine 110 is limited to one. The skeleton 120 or the proxy 140 included in one machine 110 communicate through the CM 150 and inter-process communication (IPC) included in the same machine 110. The skeleton 120 and the proxy 140 included in the same machine 110 are not directly connected to each other.

The skeleton 120 transmits a communication setting command for a service provided through a service provider port 122 which is a communication port for providing a service, and data used in relation to the service to the CM 150.

The proxy 140 has a service consumer port 142 which is a communication port for using a service. The proxy 140 transmits a communication setting command for a service used through the service consumer port 142 and data used in relation to the service to the CM 150.

The CM 150 has an IPC port 152 to process a request input from each vehicle application. Through the IPC port 152, the CM 150 receives data transmitted by a vehicle application, processes the received data, and transmits the processed data to a target application.

To communicate with other ECUs (other ECUs physically separated in the same vehicle), the CM 150 has a SOME/IP service discovery multicast port (hereinafter "SD multicast port") 172 and a SOME/IP service endpoint port (hereinafter "service endpoint port") 182. The ports 172 and 182 are connected to the Ethernet 190 of the vehicle.

Figure 2:
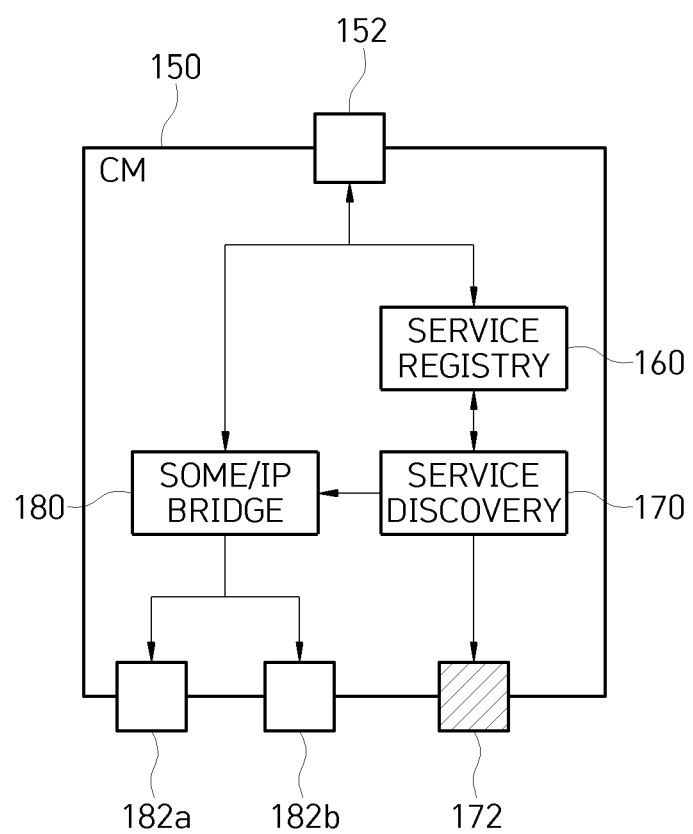
FIG. 2 is a configuration diagram of a service communication management (CM).

FIG. 2 is a configuration diagram of the CM 150 according to an embodiment of the present invention. As shown in FIG. 2, the CM 150 includes a service registry 160, a service discovery 170, a SOME/IP bridge 180, an IPC port 152, an SD multicast port 172, a SOME/IP remote transmission control protocol (TCP) port (hereinafter "TCP port") 182*a*, and a SOME/IP remote user diagram protocol (UDP) port (hereinafter "UDP port") 182*b*. The TCP port 182*a* and the UDP port 182*b* correspond to the service endpoint port 182.

The CM 150 has the IPC port 152 for communication with the skeleton 120 and the proxy 140 existing in the same machine 110.

The IPC port 152 is a port for communication with the skeleton 120 and the proxy 140 existing in the same machine 110. When a received message is a service discovery message, the IPC port 152 transfers the message to the service registry 160, and when the received message is a service message, the IPC port 152 transfers the message to the SOME/IP bridge 180.

The service registry 160 is a data structure in which information on a service provided by the skeleton 120 or a service used by the proxy 140 in the machine 110 is stored.

When the service registry 160 receives a start-of-service-provision notification message (an OfferService message) or a search request message for service use (a FindService message) from the IPC port 152 or the SD multicast port 172, the service registry 160 determines whether corresponding service information has been registered in the service registry 160. When the service has not been registered in an existing table, the service registry 160 registers information on the service in the table. Also, the service registry 160 determines a type of newly registered service information. The service registry 160 does not transfer the newly registered service information to the service discovery 170 when the newly registered service information is of an IPC type, and transfers the newly registered service information to the service discovery 170 when the newly registered service information is of a SOME/IP type.

When a stop-of-service-provision notification message (a StopOfferService message) is received, the service registry 160 determines whether corresponding service information has been registered therein. When the corresponding service information has been registered in the service registry 160, the service registry 160 removes the information from the table. When the corresponding service information has not been registered in the service registry 160, the service registry 160 determines the type of service information. The service registry 160 does not transfer the service information to the service discovery 170 when the service information is of the IPC type, and transfers the service information to the service discovery 170 when the service information is of a SOME/IP type.

When it is necessary to provide a service registered in the service registry 160 to a vehicle application of another ECU or it is necessary for the service to use a vehicle application of another ECU, the service discovery 170 transmits a message for such service provision or use through Ethernet multicast. Also, the service discovery 170 receives a service provision and search request message for a service registered in another ECU. To this end, the service discovery 170 has the SD multicast port 172 bound by Ethernet multicast. Service-oriented communication of an AP is performed when several services join in common Ethernet multicast. The SD multicast port 172 transmits a service discovery message generated by the service discovery 170 to another ECU through Ethernet multicast related thereto, receives a SOME/IP service discovery message transmitted by the other ECU through Ethernet multicast related thereto, and transfers the SOME/IP service discovery message to the service discovery 170.

When a time-to-live (TTL) expires after a SOME/IP service discovery OfferService message or a SOME/IP service discovery FindService message is generated and transmitted, the service discovery 170 terminates an instance of a corresponding service. Also, even before a TTL expires, the skeleton 120 may request StopOfferService. Then, the service discovery 170 generates a SOME/IP service discovery StopOfferService message on the basis of corresponding service information, transmits the message through Ethernet multicast, and then terminates an instance of a corresponding service.

The SOME/IP bridge 180 is an instance dynamically generated by the service discovery 170 when a registered service requests that data required for service processing be transmitted and received using a SOME/IP protocol. One or more SOME/IP bridges 180 may be generated. The SOME/IP bridge 180 is in charge of data communication in accordance with a service provided or used by another ECU. To this end, each SOME/IP bridge 180 has a TCP port 182*a* and a UDP port 182b. When network endpoint information is received from the service discovery 170, the SOME/IP bridge 180 opens the TCP port 182a and the UDP port 182b which are POSIX Ethernet sockets. At this time, required network endpoint information is an IP address, a port number, and protocol information to be used by a SOME/IP-based service instance. As the protocol, only the TCP or UDP is allowed.

Also, when a service message is received from the IPC port 152, the SOME/IP bridge 180 adds a SOME/IP header in front of the data and then transfers the SOME/IP message to the TCP port 182a or the UDP port 182b so that the SOME/IP message is transmitted through the ports.

Further, when a SOME/IP message transmitted by a service instance of another ECU is received from the TCP port 182a or the UDP port 182b, the SOME/IP bridge 180 determines whether the received SOME/IP message matches a service registered in the service registry 160. When the message matches a service registered in the service registry 160, the SOME/IP bridge 180 receives an endpoint address of an application corresponding to the matching service from the service registry 160. The SOME/IP bridge 180 transfers the message and the endpoint address of the application to the IPC port 152 so that the IPC port 152 may transmit the message to the skeleton 120 or the proxy 140 connected thereto.

FIGS. 3A, 3B, 3C, and 4 are flowcharts illustrating processing methods of the CM 150 in accordance with the type and content of a message in a case in which the message is input to the IPC port 152 of the CM 150. Before describing the drawings, message types received at the IPC port 152 will be described.

Messages received at the IPC port 152 are classified as ① service discovery messages and ② service messages. ① Service discovery messages are messages for a vehicle application to start or stop providing a service or to request a search for using a service. ② Service messages are messages transmitted and received between connected service instances to provide and use an actual service after the service is registered. The IPC port 152 distinguishes between ① and ② using protocol headers.

When the skeleton 120 starts or stops providing a service using a service offering application programming interface (API), the skeleton 120 generates and transmits a service discovery message to the CM 150. When the skeleton 120 starts providing a service, the skeleton 120 generates and transmits an OfferService message to the CM 150. When the skeleton 120 stops providing a service, the skeleton 120 generates and transmits a StopOfferService message to the CM 150.

When the proxy 140 starts a service search using a service search API, the proxy 140 generates and transmits a FindService message which is one of service discovery messages to the CM 150.

When a service discovery message is received, the IPC port 152 transfers the message to the service registry 160.

When a service message is received, the IPC port 152 determines whether a service identifier (ID) of the service message is in the service registry 160. When the service ID is in the service registry 160, the IPC port 152 transfers the service message to the SOME/IP bridge 180.

Figure 3A:
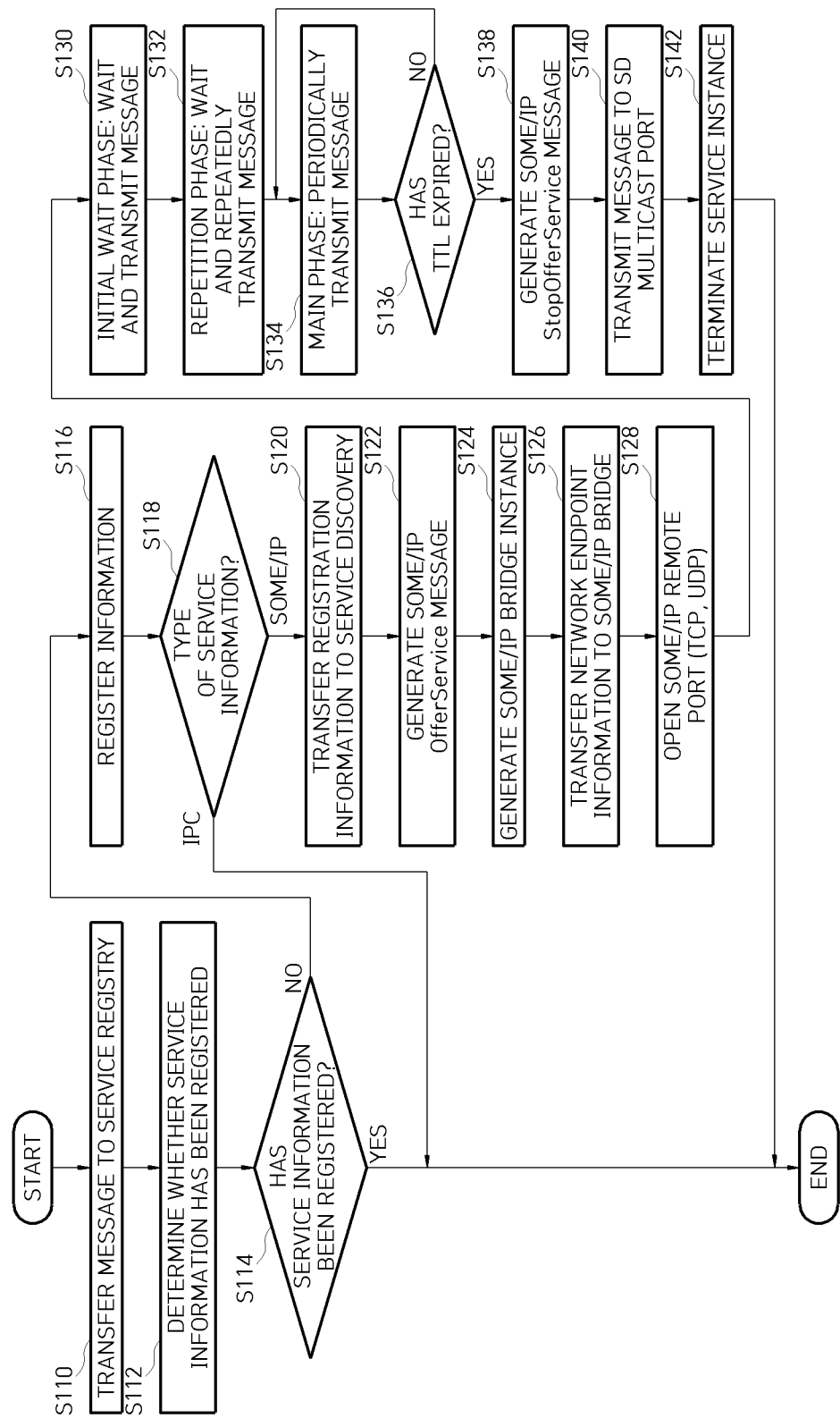
FIG. 3A is a flowchart illustrating a processing method in a case in which an OfferService message among service discovery messages is input to an inter-process communication (IPC) port of a service CM.

FIG. 3A is a flowchart illustrating a processing method in a case in which an OfferService message among service discovery messages is input to the IPC port 152 of the CM 150.

In operation S110, the IPC port 152 transfers an OfferService message to the service registry 160 because the OfferService message is a service discovery message.

In operation S112, the service registry 160 determines whether service information related to the OfferService message has been registered.

In operation S114, when service information related to the OfferService message has already been registered in the service registry 160, the service is ignored without being registered. When service information related to the OfferService message has not been registered in the service registry 160, operation S116 is performed.

In operation S116, the service registry 160 registers the service information related to the OfferService message. An instance specifier of the provided service, a service ID, an instance ID, version information, and network endpoint information of an application are registered as a tuple of a table.

In operation S118, the service registry 160 determines the type of registered service information. When the registered service information is of the IPC type, the service registry 160 does not transfer registration information to the service discovery 170. When the registered service information is of the SOME/IP type, operation S120 is performed.

In operation S120, the service registry 160 transfers the registration information to the service discovery 170.

In operation S122, the service discovery 170 generates a SOME/IP service discovery OfferService message (hereinafter "SOME/IP SD OfferService message") because the information received by the service discovery 170 has been derived from the OfferService message.

In operation S124, to process the message, the service discovery 170 generates the SOME/IP bridge 180.

In operation S126, the service discovery 170 transfers the network endpoint information received from the service registry 160 to the SOME/IP bridge 180.

In operation S128, the SOME/IP bridge 180 opens the TCP port 182a and the UDP port 182b which are POSIX Ethernet sockets on the basis of the network endpoint information. At this time, required network endpoint information is an IP address, a port number, and protocol information to be used by the SOME/IP-based service instance. As the protocol, only the TCP or UDP is allowed.

Transmission or standby of the generated SOME/IP SD OfferService message is divided into an initial wait phase S130, a repetition phase S132, and a main phase S134.

In operation S130, the service discovery 170 waits for a time specified in the information received from the service registry 160 and then transmits the SOME/IP SD OfferService message through the SD multicast port 172 using related Ethernet multicast.

In operation S132, the service discovery 170 waits for the time specified in the information received from the service registry 160 and then transmits the SOME/IP SD OfferService message through the SD multicast port 172 using related Ethernet multicast.

In operation S134, the service discovery 170 transmits the SOME/IP SD OfferService message at periods specified in the information received from the service registry 160 through the SD multicast port 172 using related Ethernet multicast.

In operation S136, it is determined whether a specified TTL has expired. When the TTL has not expired, operation S134 is continuously performed. When the specified TTL has expired, operation S138 is performed.

In operation S138, the service discovery 170 generates a SOME/IP service discovery StopOfferService message (hereinafter "SOME/IP SD StopOfferService message") on the basis of the service information and transmits the SOME/IP SD StopOfferService message through the SD multicast port 172 using related Ethernet multicast (S140).

In operation S142, the service discovery 170 terminates the instance of the corresponding service.

Figure 3B:
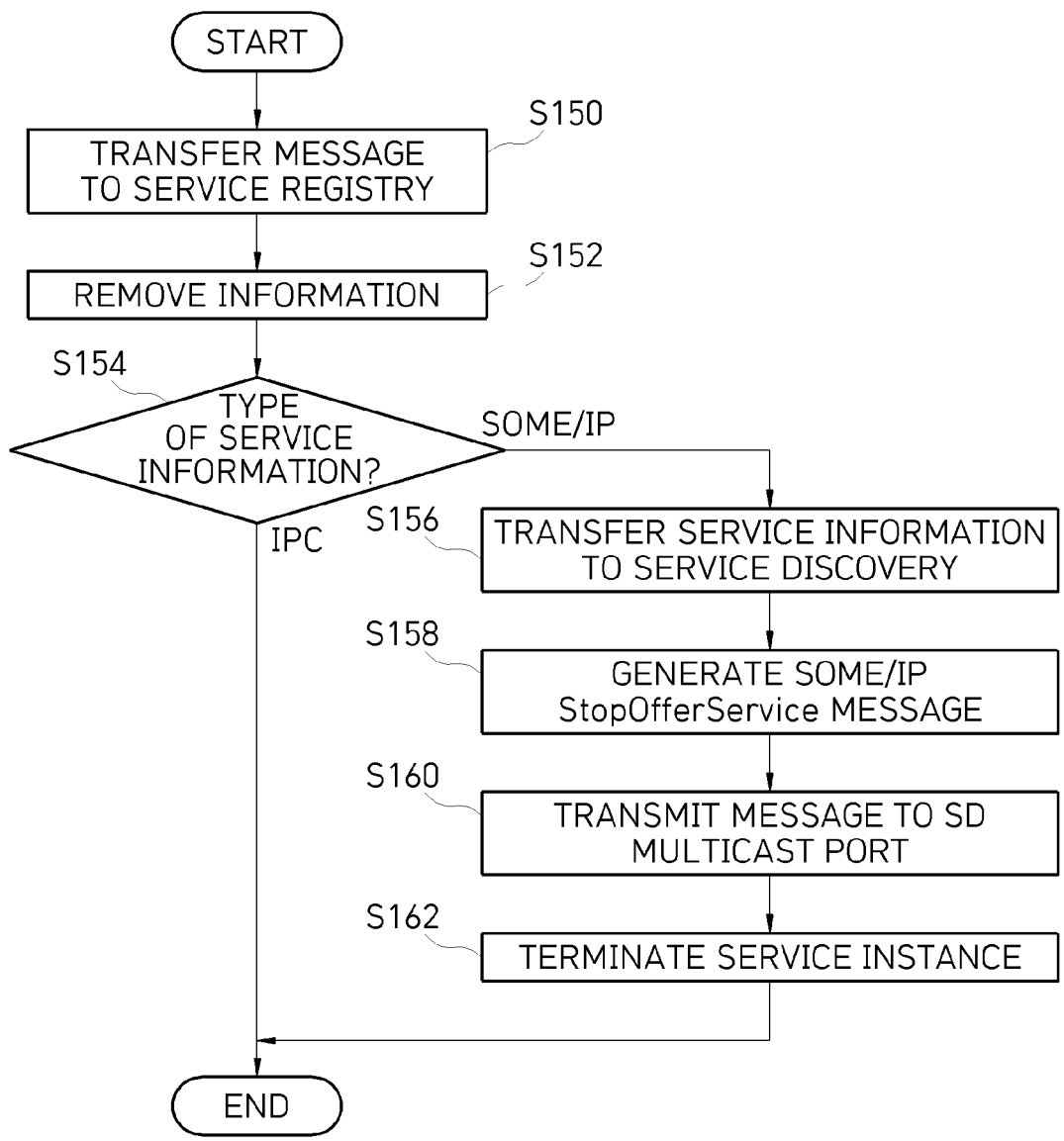
FIG. 3B is a flowchart illustrating a processing method in a case in which a StopOfferService message among service discovery messages is input to an IPC port of a service CM.

Even before the specified TTL expires, a case in which the skeleton 120 request StopOfferService corresponds to the description of FIG. 3B (S150 to S166).

FIG. 3B is a flowchart illustrating a processing method in a case in which a StopOfferService message among service discovery messages is input to the IPC port 152 of the CM 150.

In operation S150, the IPC port 152 transfers a StopOfferService message to the service registry 160 because the StopOfferService message is a service discovery message.

In operation S152, the service registry 160 removes the information from a table.

In operation S154, the service registry 160 determines the type of service information. When the service information is of the IPC type, the service registry 160 does not transfer the service information to the service discovery 170. When the service information is of the SOME/IP type, operation S156 is performed.

In operation S156, the service registry 160 transfers the service information to the service discovery 170.

In operation S158, the service discovery 170 generates a SOME/IP SD StopOfferService message because the information received by the service discovery 170 has been derived from the StopOfferService message.

In operation S160, the service discovery 170 transmits the message through the SD multicast port 172 using Ethernet multicast.

In operation S162, the service discovery 170 terminates an instance of a corresponding service.

Figure 3C:
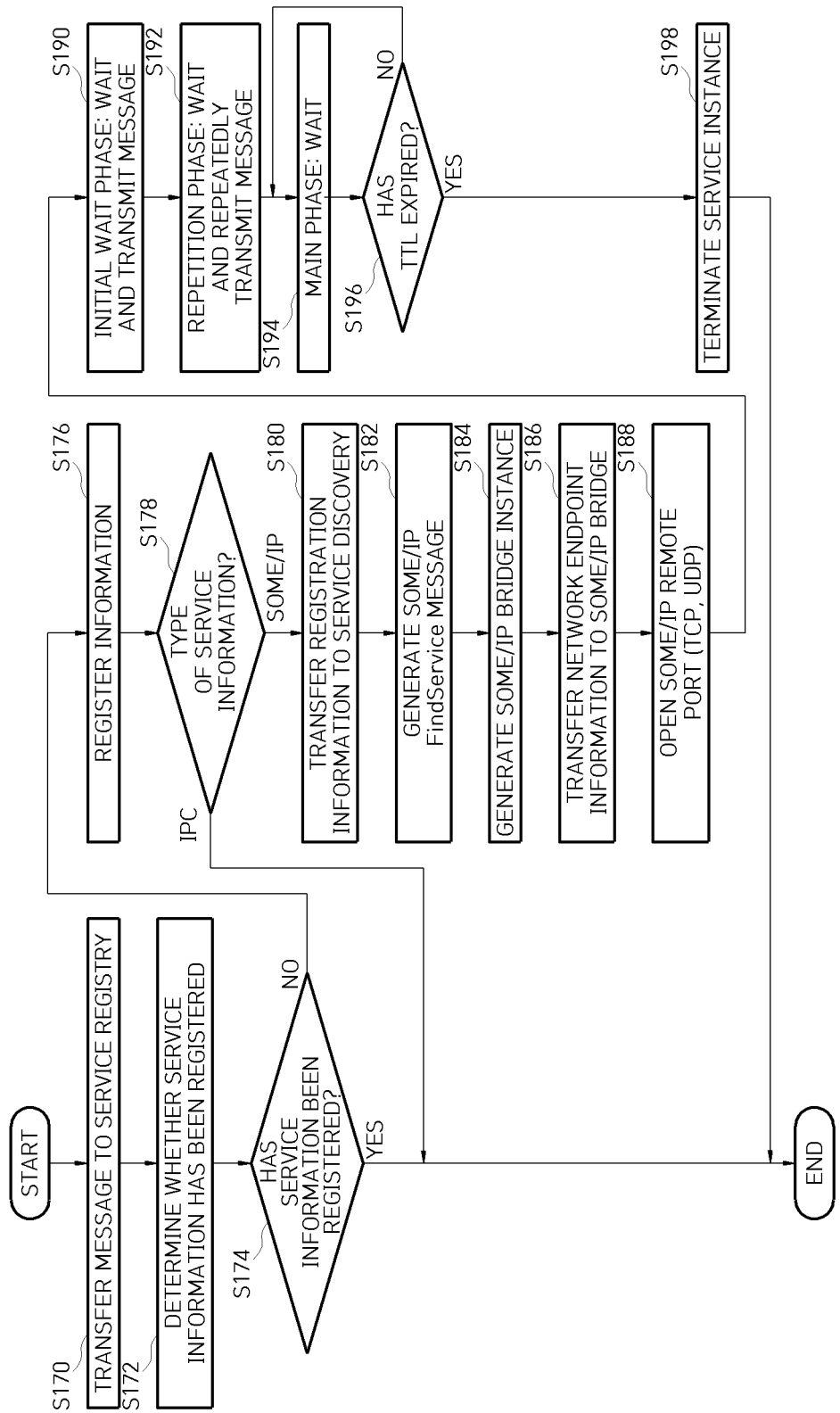
FIG. 3C is a flowchart illustrating a processing method in a case in which a FindService message among service discovery messages is input to an IPC port of a service CM.

FIG. 3C is a flowchart illustrating a processing method in a case in which a FindService message among service discovery messages is input to the IPC port 152 of the CM 150 according to an embodiment of the present invention.

In operation S170, the IPC port 152 transfers a FindService message to the service registry 160 because the FindService message is a service discovery message.

In operation S172, the service registry 160 determines whether service information related to the FindService message has been registered.

In operation S174, when service information related to the FindService message has already been registered in the service registry 160, the service is ignored without being registered. When service information related to the FindService message has not been registered in the service registry 160, operation S176 is performed.

In operation S176, the service registry 160 registers the service information related to the FindService message. An instance specifier of the service to be searched for, a service ID, a required instance ID, required version information, and network endpoint information of an application are registered as a tuple of a table.

In operation S178, the service registry 160 determines the type of registered service information. When the registered service information is the IPC type, the service registry 160 does not transfer registration information to the service discovery 170. When the registered service information is the SOME/IP type, operation S180 is performed.

In operation S180, the service registry 160 transfers the registration information to the service discovery 170.

In operation S182, the service discovery 170 generates a SOME/IP service discovery FindService message (hereinafter "SOME/IP SD FindService message") because the information received by the service discovery 170 has been derived from the FindService message.

In operation S184, to process the message, the service discovery 170 generates an instance of the SOME/IP bridge 180. At this time, the service discovery 170 transfers the network endpoint information received from the service registry 160 to the SOME/IP bridge 180 (S186).

In operation S186, the SOME/IP bridge 180 opens the TCP port 182*a* and the UDP port 182*b* which are POSIX Ethernet sockets on the basis of the network endpoint information. At this time, required network endpoint information is an IP address, a port number, and protocol information to be used by the SOME/IP-based service instance. As the protocol, only the TCP or UDP is allowed.

Transmission or standby of the generated SOME/IP SD FindService message is divided into an initial wait phase S190, a repetition phase S192, and a main phase S194.

In operation S190, the service discovery 170 waits for a time specified in the information received from the service registry 160 and then transmits the SOME/IP SD FindService message through the SD multicast port 172 using related Ethernet multicast.

In operation S192, the service discovery 170 waits for the time specified in the information received from the service registry 160 and then transmits the SOME/IP SD FindService message through the SD multicast port 172 using related Ethernet multicast.

In operation S194, the service discovery 170 waits without transmitting the SOME/IP SD FindService message.

In operation S196, it is determined whether a specified TTL has expired. When the TTL has not expired, operation S194 is continuously performed. When the specified TTL has expired, operation S198 is performed.

In operation S198, the service discovery 170 terminates the instance of the corresponding service.

Figure 4:
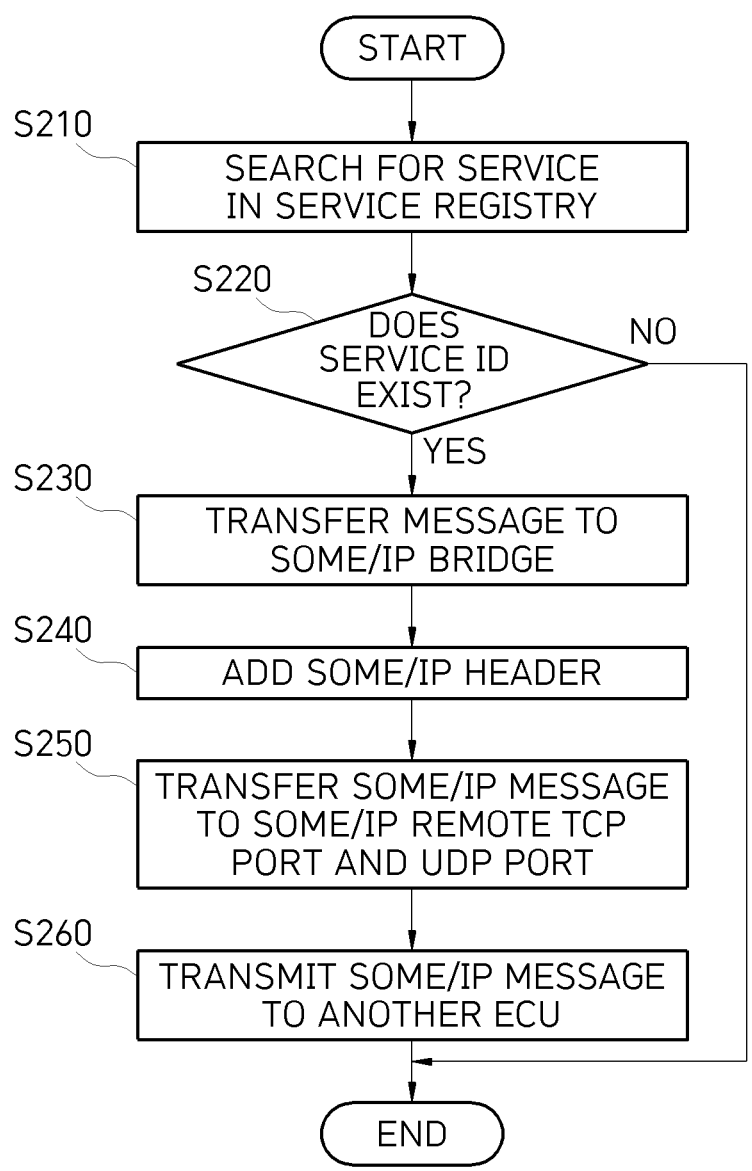
FIG. 4 is a flowchart illustrating a processing method in a case in which a service message is input to an IPC port of a service CM.

FIG. 4 is a flowchart illustrating a processing method in a case in which a service message is input to the IPC port 152 of the CM 150.

In operation S210, when a received message is a service message, the IPC port 152 determines whether the service ID is in the service registry 160.

In operation S220, when the service ID exists in the service registry 160, operation S230 is performed because the SOME/IP bridge 180 has been generated.

In operation S230, the IPC port 152 transfers the service message to the SOME/IP bridge 180.

In operation S240, the SOME/IP bridge 180 adds a SOME/IP header in front of the received data.

In operation S250 and S260, the SOME/IP bridge 180 transmits the SOME/IP message to another ECU through the TCP port 182*a* or the UDP port 182*b* by transferring the SOME/IP message to the port.

Figure 5A:
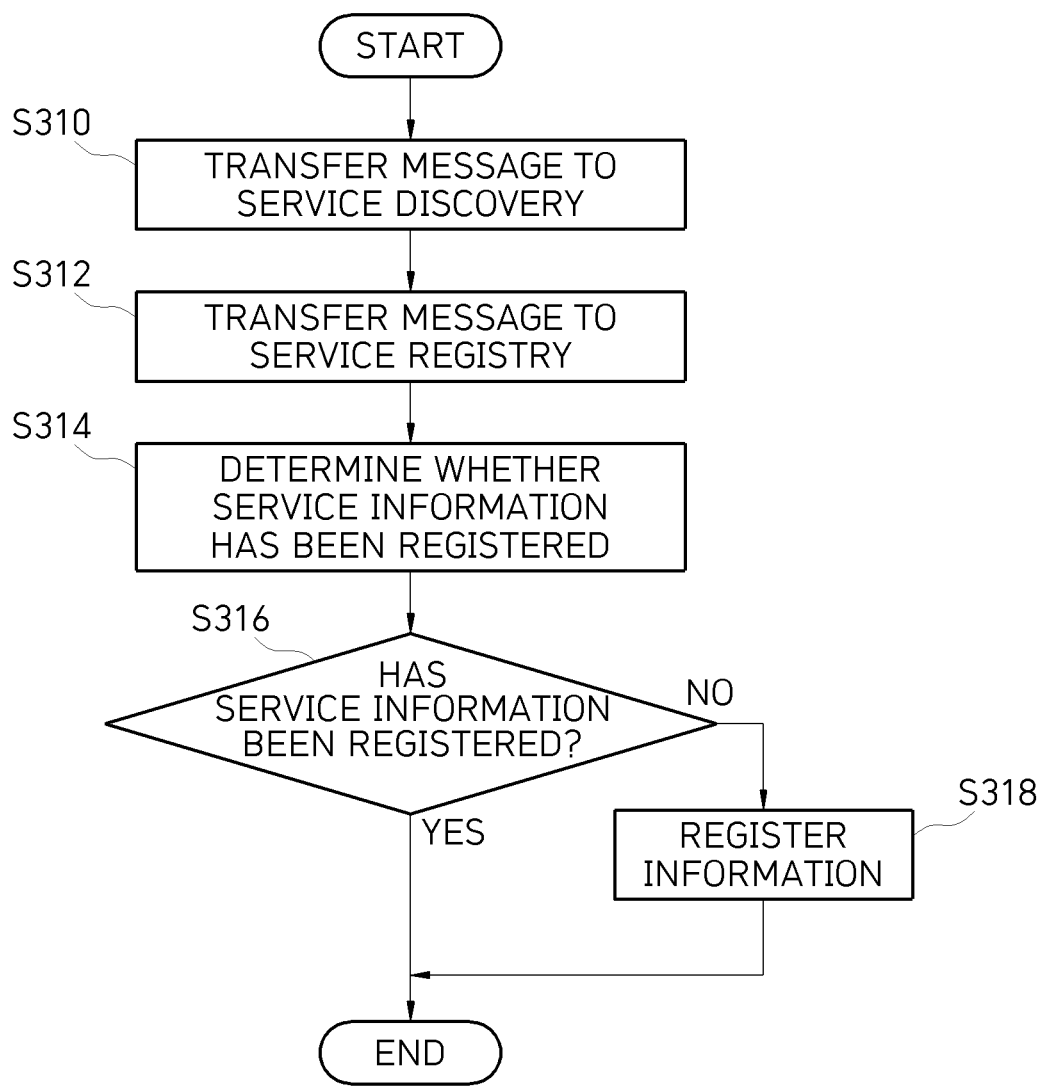
FIG. 5A is a flowchart illustrating a processing method in a case in which a Scalable service-Oriented MiddlewarE over Internet protocol (SOME/IP) service discovery OfferService message is input to a SOME/IP service discovery (SD) multicast port of a service CM.

FIG. 5A is a flowchart illustrating a processing method in a case in which a SOME/IP SD OfferService message is input to the SD multicast port 172 of the CM 150 according to an embodiment of the present invention.

In operation S310, the SD multicast port 172 receives a SOME/IP service discovery message (hereinafter "SOME/IP SD message") transmitted by another ECU through related Ethernet multicast and transfers the SOME/IP SD message to the service discovery 170.

In operation S312, when the received message is a SOME/IP SD OfferService message, the service discovery 170 transfers the message to the service registry 160.

In operation S314, the service registry 160 determines whether service information related to the message has been registered.

In operation S316, when service information related to the message has already been registered in the service registry 160, the service is ignored without being registered. When service information related to the message has not been registered, operation S318 is performed.

In operation S318, the service registry 160 creates a tuple by handling the service information related to the message as newly provided service information and registers the tuple.

The above message processing method including operations S310 to S318 is also applied to a case in which a message input to the SD multicast port 172 is a SOME/IP SD FindService message.

Figure 5B:
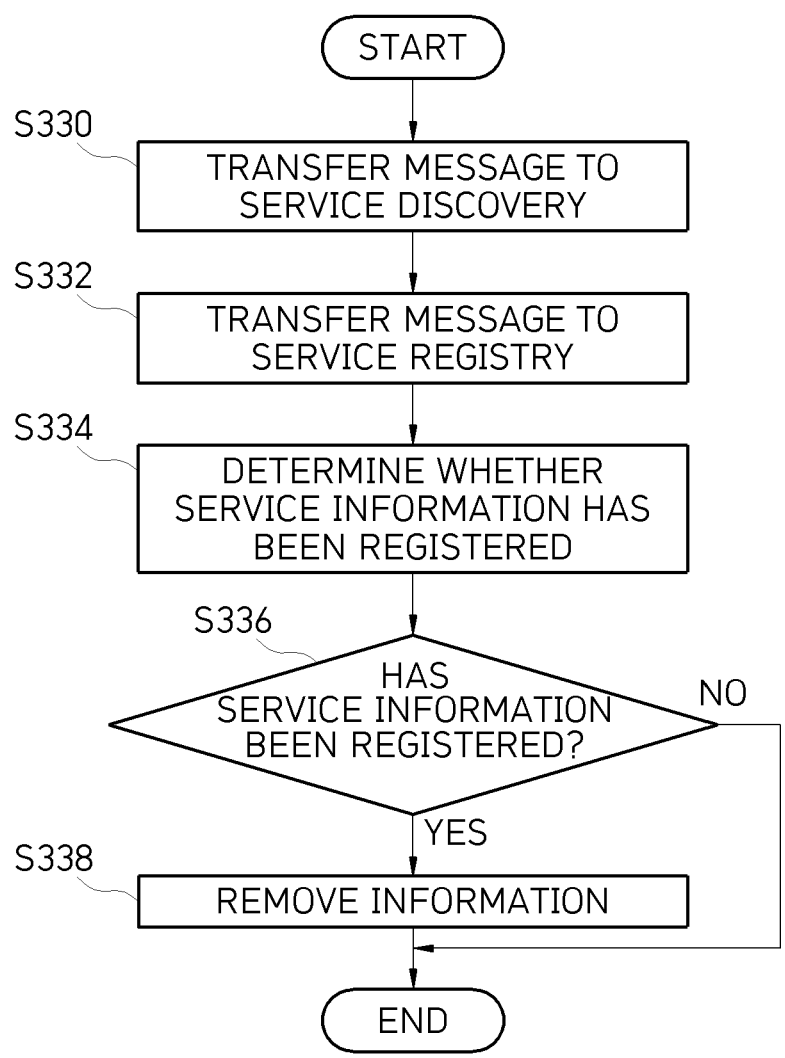
FIG. 5B is a flowchart illustrating a processing method in a case in which a SOME/IP service discovery StopOfferService message is input to a SOME/IP SD multicast port of a service CM.

FIG. 5B is a flowchart illustrating a processing method in a case in which a SOME/IP SD StopOfferService message is input to the SD multicast port 172 of the CM according to an embodiment of the present invention.

In operation S330, the SD multicast port 172 receives a SOME/IP service discovery message (hereinafter "SOME/IP SD message") transmitted by another ECU through related Ethernet multicast and transfers the SOME/IP SD message to the service discovery 170.

In operation S332, when the received message is a SOME/IP SD StopOfferService message, the service discovery 170 transfers the message to the service registry 160.

In operation S334, the service registry 160 determines whether service information related to the message has been registered.

In operation S336, when service information related to the message has not been registered in the service registry, the information is ignored. When service information related to the message has been registered, operation S338 is performed.

In operation S338, the service registry 160 removes a service information tuple related to the message.

Figure 6:
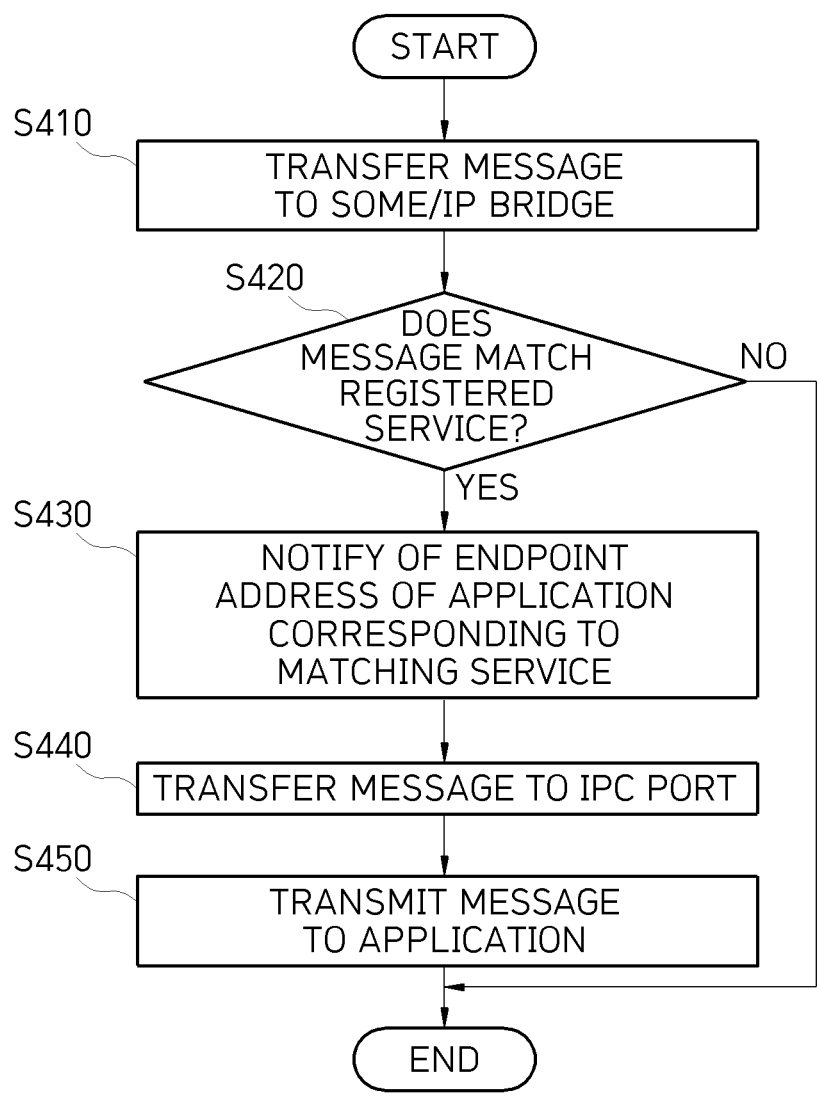
FIG. 6 is a flowchart illustrating a processing method in a case in which a message is input to a SOME/IP service endpoint port of a service CM.

FIG. 6 is a flowchart illustrating a processing method in a case in which a message is input to the service endpoint port 182 of the CM 150. The TCP port 182a and the UDP port 182b correspond to the service endpoint port 182.

In operation S410, the service endpoint port 182 receives a SOME/IP message transmitted by a service instance of another ECU through a connected Ethernet and transfers the SOME/IP message to the SOME/IP bridge 180.

In operation S420, the SOME/IP bridge 180 determines whether the received SOME/IP message matches a service registered in the service registry 160. When the message matches a service registered in the service registry 160, operation S430 is performed.

In operation S430, the service registry 160 notifies the SOME/IP bridge 180 of an endpoint address of an application corresponding to the matching service.

In operation S440, the SOME/IP bridge 180 transfers the received message and the received endpoint address of the application to the IPC port 152.

In operation S450, the IPC port 152 transmits the message to the skeleton 120 or the proxy 140 connected thereto.

Figure 7A:
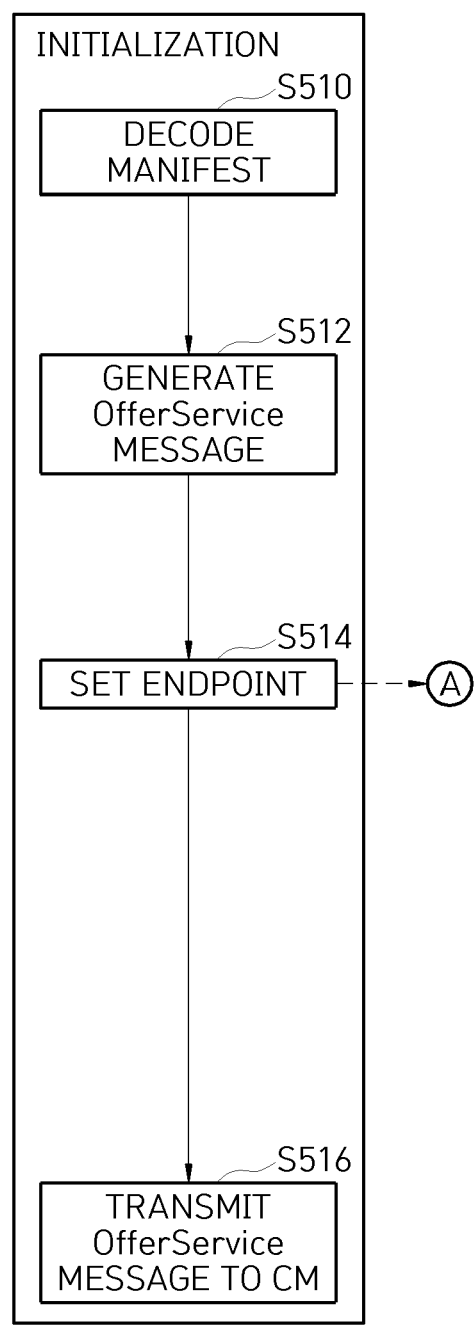
FIGS. 7A-7C are flowcharts illustrating a service-oriented communication method of a skeleton.
Figure 7B:
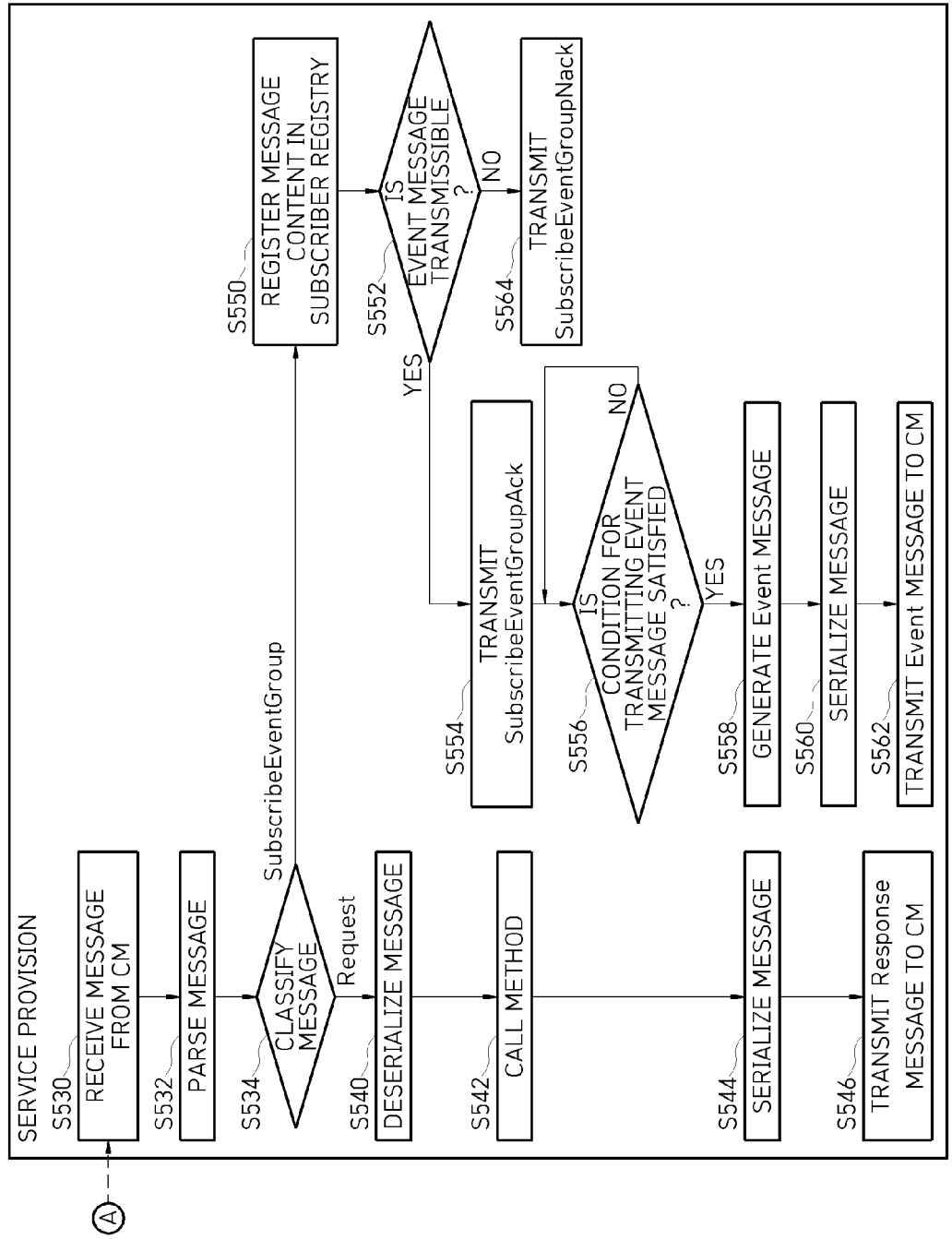
Figure 7C:
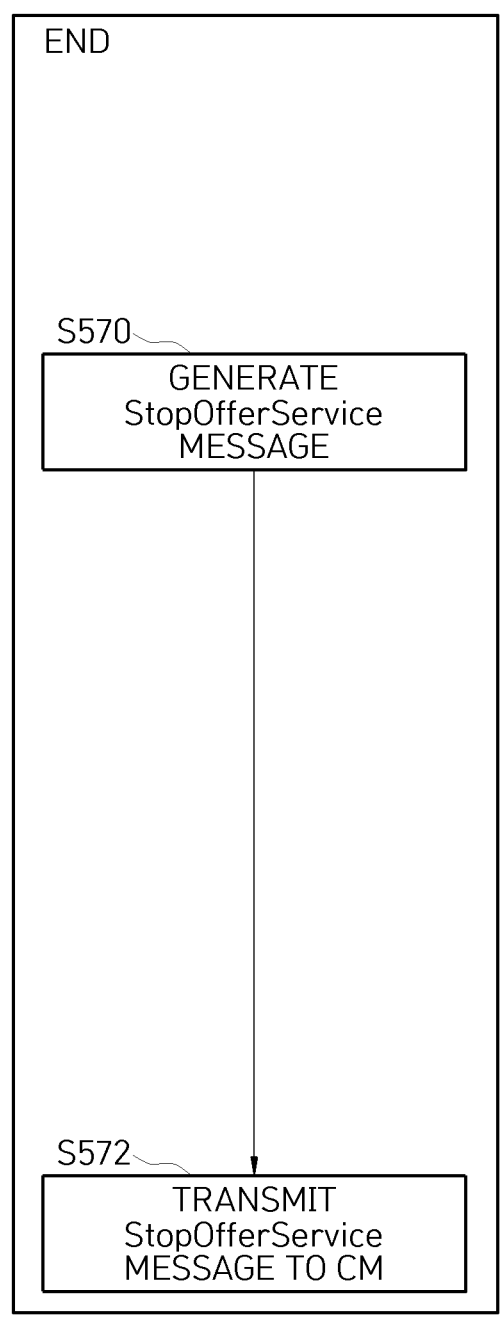

FIGS. 7A-7C are flowcharts illustrating a service-oriented communication method of the skeleton 120 according to an embodiment of the present invention. The service-oriented communication method may be generally divided into an "initialization" part of initializing a service provider instance, a "service provision" part of processing service data communication after service registration and search are completed, and an "end" part of terminating the service provider instance.

In the "initialization" part, a service instance is initialized.

In operation S510, a manifest which is a setting file of a service is decoded. In this way, it is possible to know the ID of the service to be provided, the ID of an instance, the version of the service, and whether service information is of the IPC type or the SOME/IP type.

In operation S512, an OfferService message to be transferred to the CM 150 is generated.

In operation S514, the skeleton 120 sets and opens an endpoint that will communicate with the CM 150.

In operation S516, the OfferService message is transmitted to the CM 150 through the service provider port 122 of the skeleton 120. The OfferService message is a service discovery message, meaning that an application will provide the service.

The "service provision" part is started when the service registry 160 and the service discovery 170 related to service provision of the CM 150 are initialized. However, when the provided service is of the SOME/IP type, the service provision part is not started until the SOME/IP bridge 180 is initialized. In the service provision part, an operation of receiving a message from the CM 150, processing a service requested by the proxy 140, and transmitting a result message to the CM 150 is performed.

In operation S530, a service message (a message requesting a service) is received from the CM.

In operation S532, the received message is parsed.

In operation S534, the received message is classified as one of two messages in accordance with the parsing result. The first message is a Request message for calling a method (a function provided by the service), and the second message is a SubscribeEventGroup message for subscribing to Event messages which are unilaterally generated and transmitted by the service. When the received message is the Request message, operation S540 is performed. When the received message is the SubscibeEventGroup message, operation S550 is performed.

In operation S540, the received message is deserialized. In this way, a parameter for using the function provided by the method is separated.

In operation S542, the parameter is input to call the method. When a response to the proxy 140 that has requested the service is required, the called method generates a Response message.

In operation S544, the generated Response message is serialized.

In operation S546, the serialized Response message is transmitted to the CM 150 through the service provider port 122 of the skeleton 120.

In operation S550, the content of the message is registered in a subscriber registry. The registered content is information on a subscriber who may receive an Event message provided by the service.

In operation S552, it is determined whether an Event message is transmissible. When an Event message is transmissible, operation S554 is performed. When an Event message is not transmissible, operation S564 is performed.

In operation S554, a SubscribeEventGroupAck message which is a service discovery message is transmitted.

In operation S556, it is determined whether a condition for transmitting an Event message to a subscriber is satisfied. When the condition is satisfied, operation S558 is performed.

In operation S558, an Event message is generated. The Event message may include data implemented by a user. The user is a subject who uses the device (e.g., the machine) of the present invention and should be continuously interpreted with the same meaning.

In operation S560, the Event message is serialized.

In operation S562, the serialized Event message is transmitted to the CM 150 through the service provider port 122 of the skeleton 120.

In operation S564, a SubscribeEventgroupNack message which is a service discovery message is transmitted, and no more Event message is transmitted to the subscriber.

In the "end" part, the service instance is terminated.

In operation S570, when a condition for terminating the service instance is satisfied, a StopOfferService message is generated. The StopOfferService message is a service discovery message, meaning that service provision will be ended.

In operation S572, the StopOfferService message is transmitted to the CM 150 through the service provider port 122 of the skeleton 120.

Figure 8A:
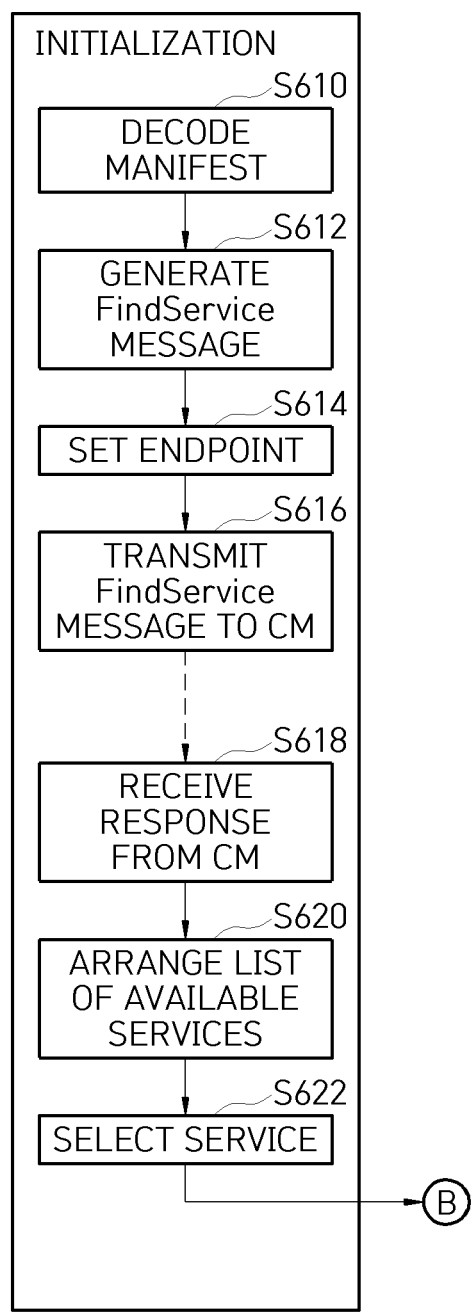
FIGS. 8A-8C are flowcharts illustrating a service-oriented communication method of a proxy.
Figure 8B:
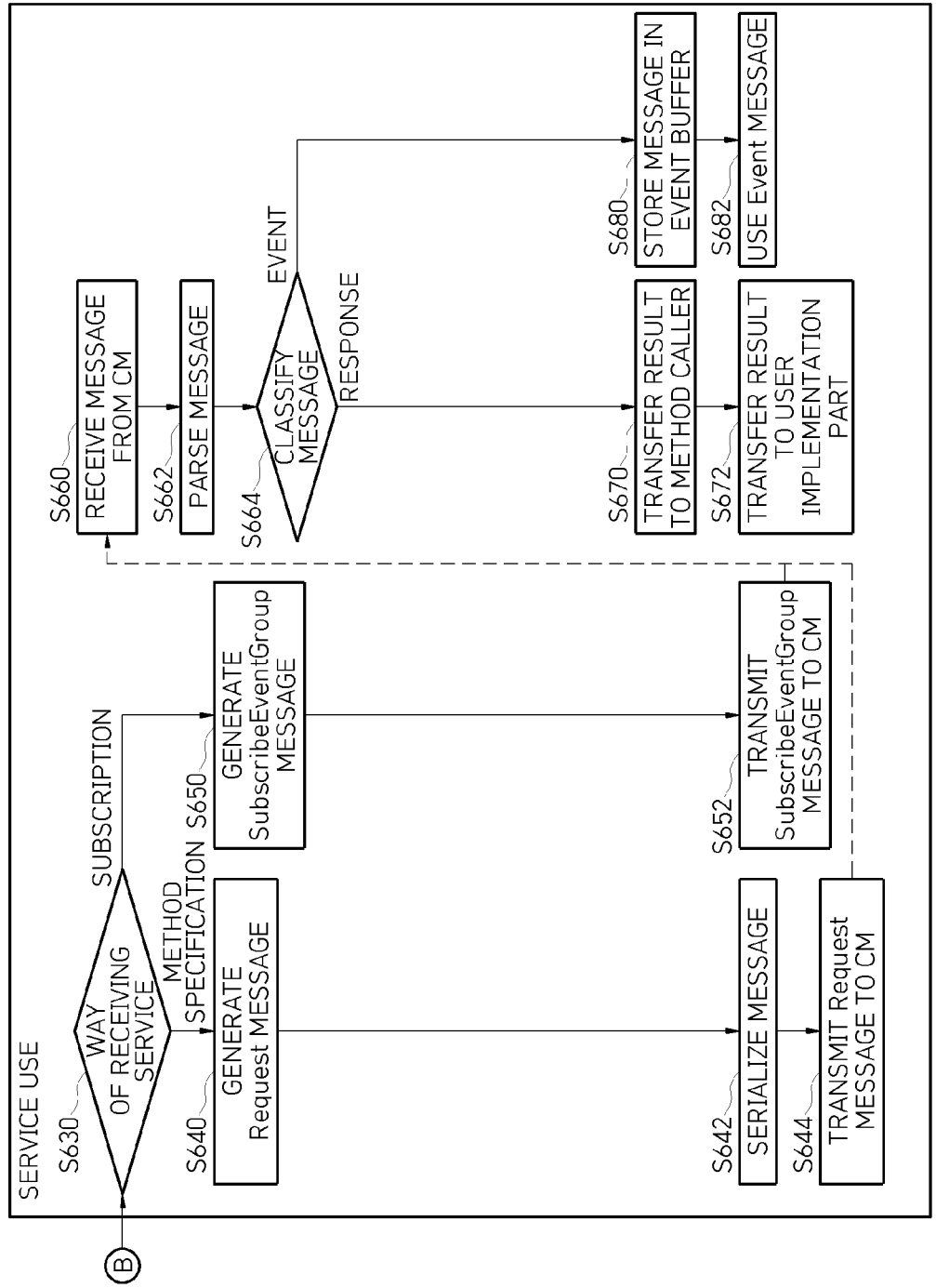
Figure 8C:
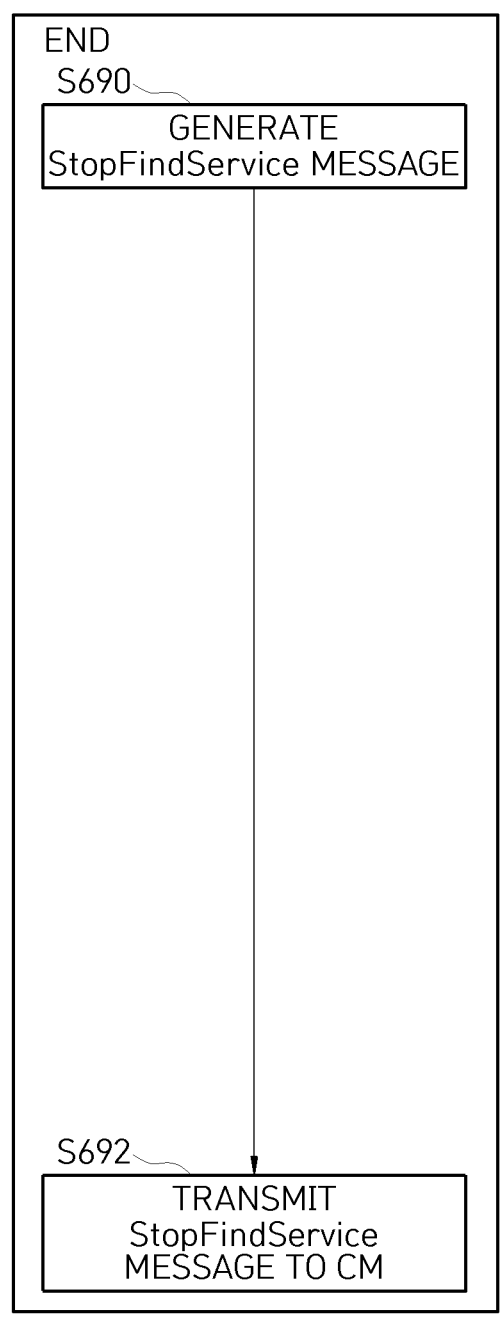

FIGS. 8A-8C are flowcharts illustrating a service-oriented communication method of a proxy. The service-oriented communication method may be generally divided into an "initialization" part of initializing a service consumer instance, a "service use" part of processing service data communication after a service search is completed, and an "end" part of terminating the service consumer instance.

In the "initialization" part, a service instance is initialized.

In operation S610, a manifest which is a setting file of a service is decoded. In this way, it is possible to know the ID of the service to be searched for, the ID of a required instance, a required version of the service, and whether service information is of the IPC type or the SOME/IP type.

In operation S612, a FindService message to be transferred to the CM 150 is generated.

In operation S614, the proxy 140 sets and opens an endpoint that will communicate with the CM 150.

In operation S616, the FindService message is transmitted to the CM 150 through the service consumer port 142 of the proxy 140. The FindService message is a service discovery message, meaning that it will be determined whether a service to be used by an application is being provided. After the FindService message is transmitted to the CM 150, the proxy 140 waits until a response is received from the CM 150.

When a response (a search result) is received from the CM 150 (S618), in operation S620, a proxy handler arranges a list of currently available services and then transfers whether the service has been found and an item of the found service to the application.

In operation S622, the application selects one of the available services.

The "service use" part is started when the service registry 160 and the service discovery 170 are initialized in a state in which the service search in the CM 150 and connection between the proxy 140 and the CM 150 are completed. However, when the service used by the proxy 140 is of the SOME/IP type, the service use part is not started until the SOME/IP bridge 180 is initialized. In the service use part, an operation of transmitting a message for requesting a service required by the proxy 140 to the CM 150, receiving a result message from the CM 150, and processing the result message is performed.

Operation S630 branches out into operation S640 or S650 in accordance with a way in which the proxy 140 receives a service. The proxy 140 uses a method of the skeleton 120 via the CM 150 using a method caller in two ways: ① a way of calling a corresponding method by specifying the method of the skeleton 120 and ② a way of subscribing to a specific event of the skeleton 120. A selection between ① and ② is made in accordance with logic implemented in the application by the user. When ① is selected, operation S640 is performed, and when ② is selected, operation S650 is performed.

In operation S640, a Request message including an input parameter of the method to be called through the method caller is generated.

In operation S642, the generated Request message is serialized.

In operation S644, the serialized Request message is transmitted to the CM 150 through the service consumer port of the proxy 140. After the transmission, the method caller waits until a Response message is received from the CM.

In operation S650, an event to be subscribed to is designated through an event subscriber to generate a SubscribeEventgroup message which is a service discovery message.

In operation S652, the message is transmitted to the CM 150 through the service consumer port 142 of the proxy 140.

In operation S660, a service message is received from the CM.

In operation S662, the received message is parsed.

In operation S664, the parsed message is classified into one of two cases. In the first case, the proxy 140 transmits a Request message for a method in advance and receives a Response message which is a method execution result. In the second case, an Event message for an event that is subscribed to is received. In the first case, operation S670 is performed, and in the second case, operation S680 is performed.

In operation S670, the Response message is transferred to the method caller in wait.

In operation S672, the method caller transfers the result to a user implementation part of the proxy 140.

In operation S680, the Event message is stored in an event buffer without any change.

In operation S682, the stored Event message is used. The Event message may be used by the proxy 140 in the following two ways. In the first way, an implementer of the proxy 140 extracts and uses Event messages stored in the event buffer at a specific time point. The event buffer has a first-in first-out data structure and is emptied when Event messages are extracted. In the second way, the implementer of the proxy 140 binds a callback function. In this way, every time Event messages are stored in the event buffer, the bound callback function is called, and at this time point, the implementer may determine whether to extract a stored Event message.

In the "end" part, the service instance is terminated.

In operation S690, when a condition for terminating the service instance is satisfied, a StopFindService message is generated. The StopFindService message means that the proxy 140 will stop service use.

In operation S692, the StopFindService message is transmitted to the CM 150 through the service consumer port 142 of the proxy 140. When the StopFindService message is received, the CM 150 releases associated information and the instance which are registered and activated in the service discovery 170 and the SOME/IP bridge 180 (in the case of a SOME/IP service).

For reference, components according to embodiments of the present invention may be implemented in a software form or a hardware form, such as a field programmable gate array (FPGA) or an application specific integrated circuit (ASIC), and may play certain roles.

However, "components" are not limited to software or hardware. Each component may be in an addressable storage medium or configured to operate one or more processors.

Therefore, as an example, components include components such as software components, object-oriented software components, class components, and task components, processes, functions, attributes, procedures, subroutines, segments of program code, drivers, firmware, microcode, circuits, data, databases, data structures, tables, arrays, and parameters.

Components and functions provided in the components may be combined into fewer components or may be subdivided into additional components.

It is to be understood that combinations of blocks in the accompanying block diagrams or operations in the flowcharts can be executed by computer program instructions. These computer program instructions can be mounted in a processor of a general-use computer, a special-use computer, or other programmable data processing equipment. Accordingly, the instructions executed through the processor of the computer or other programmable data processing equipment generate means for performing functions described in the blocks of the flowcharts. The computer program instructions can be stored in a computer-usable or computer-readable memory which may be oriented to a computer or other programmable data processing equipment, to implement functions in a specific way. Therefore, the instructions stored in the computer-usable or computer-readable memory can be used to manufacture products including instruction means for performing functions described in the blocks of the flowcharts. The computer program instructions can also be mounted in the computer or other programmable data processing equipment. Accordingly, instructions which generate processes by performing a series of operation steps on the computer or other programmable data processing equipment and operate the computer or other programmable data processing equipment can provide steps for executing the functions described in the blocks of the flowcharts.

Each of the blocks may indicate a part of a module, segment, or code including one or more executable instructions for executing specific logical functions. In some substitutions, the functions described in the blocks can be performed out of sequence. For example, two blocks that are consecutively shown in the drawings can be performed substantially at the same time or can be occasionally performed in a reverse order of a corresponding function.

A processing method in a case in which a message is input to a port of the CM 150, a service-oriented communication method of the skeleton 120, and a service-oriented communication method of the proxy 140 have been described above with reference to the flowcharts shown in the drawings. Although the methods are shown and described in a series of blocks for the sake of simplicity, the present invention is not limited to the order of the blocks, and some blocks may be performed with other blocks simultaneously or in a different order than that shown and described herein. Various other branches, flow paths, and block sequences may be implemented to achieve identical or similar results. Also, not all illustrated blocks may be required for performing the methods described herein.

Although the configurations of the present invention have been described in detail with reference to the accompanying drawings, the configurations are merely exemplary, and various modifications and alterations can be made within the technical spirit of the present invention by those skilled in the technical field to which the present invention pertains. Therefore, the scope of the present invention is defined not by the above-described embodiments but by the following claims.

The invention claimed is:

1. A machine including an electronic control unit (ECU) to which a portable operating system interface (POSIX) operating system (OS) is ported and implementing dynamic-service-oriented communication between vehicle applications on an AUTomotive Open System ARchitecture (AUTOSAR) adaptive platform (AP), the machine comprising:
   a skeleton which is an application for providing a service on the platform;
   a proxy which is an application using the service on the platform; and
   a service communication management (CM) which is an application for brokering service-oriented communication between vehicle applications on the platform,
   wherein the service CM comprises:
   a service registry configured to store information on the service provided by the skeleton and information on the service used by the proxy;
   a service discovery configured to transmit a notification of starting to provide the service or a search request message (a service discovery message) for using the service through Ethernet multicast when a service registered in the service registry is to be provided to a vehicle application of another ECU or use the vehicle application of the other ECU;
   a Scalable service-Oriented MiddlewarE over Internet protocol (SOME/IP) bridge in charge of data communication in accordance with a service provided or used by the other ECU; and
   an inter-process communication (IPC) port used in communication between the skeleton and the proxy,
   wherein the IPC port is a port for communication with the skeleton and the proxy existing in the same machine, and
   wherein when a received message is a service discovery message, the IPC port transfers the message to the service registry, and when the received message is a service message, the IPC port transfers the message to the SOME/IP bridge.

2. The machine of claim 1, wherein the service CM further comprises:
   a service discovery multicast port configured to transmit the service discovery message generated by the service discovery to the other ECU through Ethernet multicast, receive a service discovery message transmitted by the other ECU through Ethernet multicast, and transfer the service discovery message to the service discovery; and
   a service endpoint port used in data communication between the SOME/IP bridge and the other ECU.

3. The machine of claim 2, wherein the service endpoint port follows a transmission control protocol (TCP) or a user datagram protocol (UDP).

4. The machine of claim 1, wherein the service CM is only one in the machine.

5. The machine of claim 1, wherein the skeleton and the proxy are not directly connected to each other, and
   the skeleton or the proxy communicate with the CM through IPC.

6. An input message processing method of a service communication management (CM) when a message is input to an inter-process communication (IPC) port of the service CM which brokers service-oriented communication between vehicle applications, the input message processing method comprising:

transferring the message to a service registry in which information on a service provided or used in a corresponding machine is stored;

when the message is one of a start-of-service-provision notification message and search request message for service use, and service information related to the message has not been registered in the service registry, registering the service information related to the message in the service registry;

when the message is a stop-of-service-provision notification message, and service information related to the message has been registered in the service registry, removing a tuple of the service information related to the message from the service registry; and when the service information is of a Scalable service-Oriented MiddlewarE over Internet protocol (SOME/IP) type, generating a message notifying of a start of service provision according to a SOME/IP and transmitting the message to another electronic control unit (ECU).

7. An input message processing method of a service communication management (CM) when a message following a Scalable service-Oriented MiddlewarE over Internet protocol (SOME/IP) protocol is input to a service discovery multicast port of the service CM which brokers service-oriented communication between vehicle applications, the input message processing method comprising:

transferring the message to a service registry in which information on a service provided or used in a corresponding machine is stored;

when the message is one of a start-of-service-provision notification message and search request message for service use, and service information related to the message has not been registered in the service registry, registering the service information related to the message in the service registry; and when the message is a stop-of-service-provision notification message, and service information related to the message has been registered in the service registry, removing a tuple of the service information related to the message from the service registry.

* * * * *